United States Patent [19]
Sprangle et al.

[11] Patent Number: 6,137,811
[45] Date of Patent: *Oct. 24, 2000

[54] SYSTEM FOR CONDITIONING AN ELECTRON BEAM FOR IMPROVED FREE-ELECTRON LASER OPERATION

[75] Inventors: Phillip Sprangle, Potomac; Bahman Hafizi, Bethesda, both of Md.; Glenn Joyce, Alexandria, Va.; Philip Serafim, Sudbury, Mass.

[73] Assignee: The United States of America as represented by the Secretary of the Navy, Washington, D.C.

[ * ] Notice: This patent is subject to a terminal disclaimer.

[21] Appl. No.: 08/098,989

[22] Filed: Jul. 29, 1993

[51] Int. Cl.$^7$ ........................................................ H01S 3/09
[52] U.S. Cl. .................................... 372/2; 372/5; 372/37; 372/74
[58] Field of Search .............................. 372/2, 5, 37, 74; 359/335

[56] References Cited

U.S. PATENT DOCUMENTS

| | | | |
|---|---|---|---|
| 4,287,488 | 9/1981 | Brau et al. | 372/2 |
| 4,331,936 | 5/1982 | Schlesinger et al. | 372/2 |
| 5,107,508 | 4/1992 | Piestrup | 372/2 X |
| 5,247,526 | 9/1993 | Sabia et al. | 372/2 |
| 5,263,035 | 11/1993 | Leboutet et al. | 372/2 |

OTHER PUBLICATIONS

Sessler et al., "Radio–Frequency Beam Conditioner For Fast–Wave Free–Electron Generators of Coherent Radiation", Printed in 1992 The American Physical Society, Physical Review Ltrs.; vol. 68, No. 3, Jan. 20, 1992.

Liu et al., "Laser–Powered Beam Conditioner For Free-–Electron Lasers and Synchrotrons", Printed in 1993 The American Physical Society, Physical Review Ltrs., vol. 70, No. 23, Jun. 7, 1993.

*Primary Examiner*—Hemang Sanghavi
*Attorney, Agent, or Firm*—Barry A. Edelberg

[57] ABSTRACT

A system is disclosed for developing a conditioned electron beam of high quality for an exemplary application to a free-electron source of coherent radiation. The system comprises: a source for producing an electron beam of relatively high energy, a microwave source for generating a microwave field, and a wiggler for generating transverse to the electron beam a periodic magnetic field which cooperates with the microwave field to interact with the electron beam and develop a conditioned electron beam of high quality.

15 Claims, 2 Drawing Sheets

SYSTEM FOR CONDITIONING AN ELECTRON BEAM FOR IMPROVED FREE-ELECTRON LASER OPERATION

FIELD OF THE INVENTION

This invention relates generally to a system for generating an electron beam for a free-electron laser and, more specifically, to a system for conditioning an electron beam to enhance the operation of a free-electron laser.

DESCRIPTION OF THE RELATED ART

Many sources for generating coherent radiation are based on the longitudinal bunching of electron beams. These sources include traveling wave tubes, cyclotron autoresonant masers and free-electron lasers. The degree to which an electron beam can be bunched is a strong function of the beam quality. There are two independent contributions to the quality of an electron beam. These are the intrinsic energy spread and emittance of the electron beam. The emittance is due to the electrons having a spread in pitch angle. Both the intrinsic energy spread and emittance lead to a spread in the axial electron velocity and limit the operating wavelength, gain and efficiency of the coherent radiation generation source. In the present context, an operation wherein the axial velocity spread on a beam is reduced is known as conditioning or beam conditioning.

In one proposed type of conditioning, the electron beam was propagated through a periodic array of focusing and defocusing lenses and microwave cavities located between the accelerator producing the electron beam and the free-electron laser, with the cavities being excited in an axially asymmetric mode. In a second proposed type of conditioning, a conventional laser is utilized as conditioning power to provide beam conditioning.

In order to quantify the deleterious effect of axial velocity spread on free-electron laser operation, it should be noted that in many cases electron beam quality is limited by the emittance contribution to the axial velocity spread and not by the energy spread. In this case, the wavelength limit in free-electron lasers can be expressed as: $\lambda >> \epsilon_n/\gamma_0$, where $\lambda$ is the radiation wavelength, $\epsilon_n$ is the normalized electron beam emittance and $\lambda_0$ is the relativistic factor. Thus, it is clear that electron beam quality limits the operating wavelength or the gain of free-electron lasers.

SUMMARY OF THE INVENTION

It is therefore an object of the invention to condition an electron beam in order to enhance the operation of a free-electron laser.

Another object of the invention is to reduce the axial spread on an electron beam.

Another object of the invention is to develop a conditioned electron beam of high quality.

Another object of the invention is to improve the quality of an electron beam before it is applied to a free-electron source of radiation.

Another object of the invention is to improve the quality of an electron beam to a free-electron laser to improve the efficiency of operation of the free-electron laser at a given wavelength.

A further object of the invention is to improve the quality of an electron beam to a free-electron laser to enable the free-electron laser to lase at a shorter wavelength.

These and other objects of the invention are achieved by providing a system for developing a conditioned electron beam of high quality for application to a free-electron source of coherent radiation. The system comprises: a source for producing an electron beam of relatively high energy; a microwave source for generating a microwave field; and a wiggler for generating transverse to the electron beam a periodic magnetic field which cooperates with the microwave field to interact with the electron beam and develop a conditioned electron beam of high quality.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
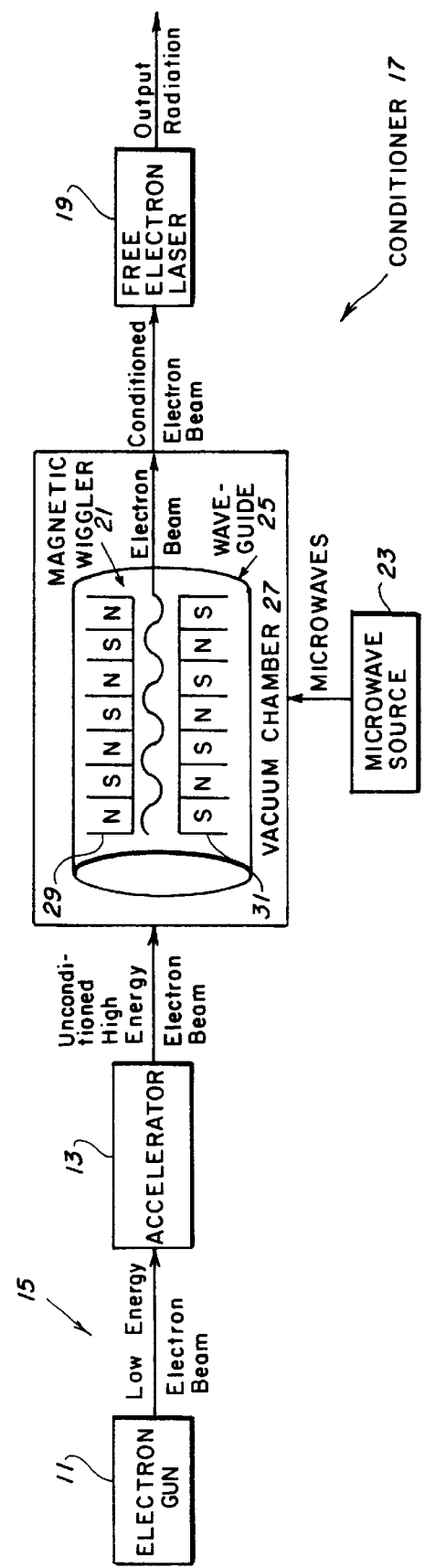
FIG. 1 illustrates a schematic block diagram of the invention.

Referring now to the drawings, FIG. 1 illustrates a preferred embodiment of the system of the invention. An electron gun 11 and an accelerator 13 comprise an electron beam generator 15. The electron gun 11, which can be a diode, emits a low energy electron beam of, for example, eight electron volts of energy. This low energy electron beam is accelerated by the accelerator 13 to a high energy electron beam of, for example, one million electron volts.

Typically, in the prior art, the high energy electron beam from the accelerator 13 in the electron beam generator 15 would be directly utilized to drive a free-electron source of coherent radiation such as a free-electron laser (FEL). However, in general, the electron beam from the accelerator 13 is not ideally suited to drive a FEL, since the electrons in the electron beam do not all possess the same axial velocity. By electrons having the same "axial velocity" it is meant that those electrons travel along the same axial path or direction with substantially the same velocity. The electron beam from the accelerator 13 is not a good quality beam because not all of the electrons are going in one direction. Although the electrons emitted by the accelerator 13 travel predominantly in one common axial direction (not shown), some of them travel in different directions. Each of these electrons traveling in different directions has a transverse velocity component as a direct function of the extent of its deviation from the common axial direction. As a result of a poor quality electron beam being used to drive a FEL, the radiation produced by the FEL may be of poor quality or of insufficient power.

In the system of FIG. 1, a conditioner 17 is utilized between the accelerator 13 and a free-electron source of coherent radiation or a free-electron laser (FEL) 19 to condition or improve the quality of the unconditioned, high energy, electron beam from the accelerator 13 so that substantially all of the electrons in the beam are going in one direction, the axial direction, and with the same velocity in that axial direction. The conditioned electron beam from the conditioner 17 is then utilized to drive the FEL 19 to produce a good output optical beam.

The conditioner 17 is comprised of a magnetic wiggler 21 and a source of microwaves or a microwave source 23. Both the magnetic wiggler 21 and the microwave source 23 are well known in the art. The magnetic wiggler 21 is disposed inside of a waveguide 25 which, in turn, is inside of a vacuum chamber 27. The vacuum chamber 27 helps to maintain the quality of the conditioned electron beam out of the wiggler 21 by eliminating the possibility of air molecules scattering electrons in the conditioned electron beam.

The magnetic wiggler 21 is comprised of a first series of permanent magnets 29 of alternating polarity positioned opposite to an associated second series of permanent magnets 31 of alternating polarity so that North (N) and South (S) poles of each of the series 29 and 31 face each other across an axial path therebetween (not shown). The magnetic wiggler 21 creates in the waveguide 25 a fixed periodic magnetic field which interacts with the unconditioned high energy electron beam being applied to the conditioner 17 from the accelerator 13. The unconditioned electron beam from the accelerator 13 has a relatively large spread in the axial velocity. While this unconditioned electron beam is passing through the wiggler 21, the magnetic field of the wiggler 21 acts on the electron beam, causing the electron beam to be wiggled. As a result, the electon beam snakes its way through the wiggler 21, as shown in FIG. 1.

Figure 2:
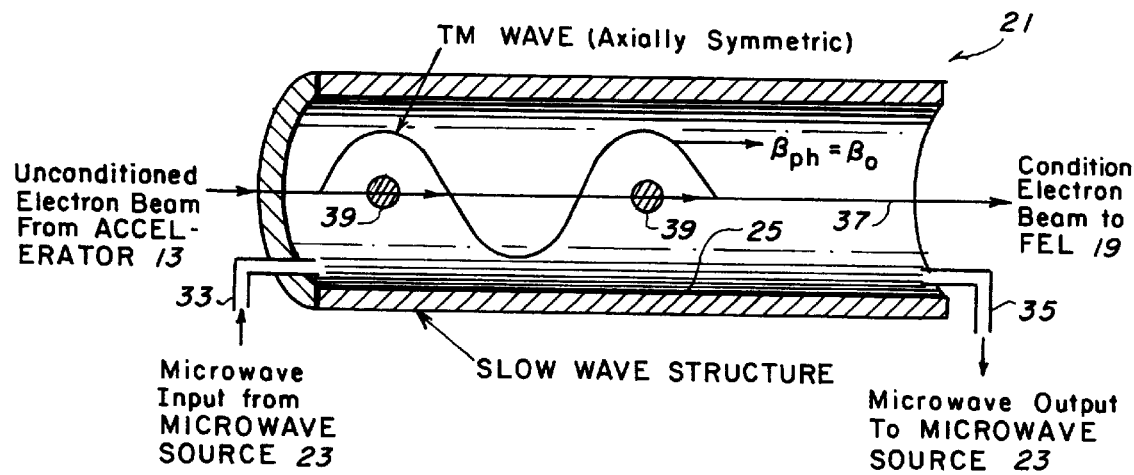
FIG. 2 is a partial view of the wiggler 21 of FIG. 1 showing a TM transverse electromagnetic wave from the microwave source 23 propagating through the waveguide 25.

The microwave source 23 can be a traveling wave tube, a klystron or any other suitable source of microwaves. Microwaves from the microwave souce 23 are coupled into the waveguide 25 that contains the wiggler 21 by way of a slot in the waveguide 25, a loop or a probe. FIG. 2 illustrates an input probe 33 for applying the microwaves from the microwave source 23 to the waveguide 25, and further illustrates an output probe 35 for returning the microwaves to the microwave source 23. Since the waveguide 25 is open at both of its ends the microwaves produce traveling waves or a traveling microwave field inside of the waveguide 25. As shown in FIG. 2, this traveling microwave field from the microwave source 23 is a TM transverse electromagnetic wave that is propagating through the waveguide 25 and also acting on the unconditioned electron beam passing through the waveguide 25. The portions 39 represent bunches of electrons from the accelerator 13 that are passing through the waveguide 25.

The fixed periodic magnetic field from the magnetic wiggler 21 and the microwave field from the microwave source 23 interact with the unconditioned high energy electron beam being applied to the wiggler 21 from the accelerator 13 to condition the electron beam so that the conditioner 17 produces and supplies a good quality electron beam to the FEL 19.

Basically, to condition the unconditioned electron beam from the accelerator 13, the microwave field from the source 23 and the magnetic field of the wiggler 21 operate in combination to adjust the velocity of each electron in the unconditioned electron beam such that all of the electrons in that beam have the same axial velocity at the output of the conditioner 17. This basic conditioning operation will now be described.

The magnetic field of the wiggler 21 is not uniform across the gap between the series 29 and the series 31. The closer to the poles of the magnets in the series 21 or the series 31, the stronger the magnetic field becomes. Thus, the electrons which have large transverse velocities experience a stronger magnetic field than electrons having the common axial velocity because they approach the poles of the magnets of the series 29 and 31 more closely. So the magnetic field of the wiggler 21 discriminates between the electrons that are moving in a transverse direction over the electrons that are moving in the axial path or direction by repelling the electrons having transverse velocities back into the axial path. The amount of repulsion of an electron is directly proportional to the closeness of that electron to the magnetic poles of the wiggler 21.

The microwave field or microwaves from the source 23 adds energy to the electrons and accelerates them by the electric field components of the microwave field. The microwave field is stronger the further it is away from the center 37 (FIG. 2) and the closer it gets to the wall (not shown) on either side of the waveguide 25. The stronger the microwave field the more it will accelerate an electron. Thus, electrons with higher transverse velocities will be accelerated more than electrons with axial velocities or electrons traveling along the axial path to enable such electrons to catch up with electrons moving along the common axial path so that all of the electrons will have the same axial velocity.

Thus, both the magnetic field of the wiggler 21 and the microwave field of the microwave source 23 operate in combination to affect the electrons with transverse velocities more than those electrons following the same axial path at the same velocity in order to produce a conditioned electron beam at the output of the conditioner 17. This conditioned electron beam is then applied from the conditioner 17 to the conventional FEL 19 to enable the FEL 19 to generate output radiation having a good output optical radiation. The above-described conditioning operation will now be further described and analyzed in more detail.

The conditioning operation described above assumes that the electrons are in motion through a planar wiggler 21 with parabolic pole faces. As shown in FIG. 2, the conditioning is provided by an axially symmetric slow TM waveguide mode. In FIG. 2 the axial velocity of an electron normalized to the speed of light is denoted by $\beta_0$. The phase velocity of the TM wave, normalized to the speed of light, is denoted by $\beta_{ph}$. In order to avoid a net acceleration of the electron beam, an inductively generated axial electric field is introduced in addition to the waveguide mode. This uniform inductive field may be generated by an azimuthal magnetic field that is confined to the cylindrical shell of a material with high permeability and high resistivity; e.g., a ferrite.

With this configuration of fields, it can be shown that the axial velocity spread on the electron beam is completely removed, i.e., the electron beam is fully conditioned provided that $$a_0 = \frac{\gamma_0^2}{2n\pi} \frac{a_w^3}{1+a_w^2/2}\left(\frac{\lambda}{\lambda_w}\right)^2, \qquad (1)$$

where:

$a_0=|e|E_0/(mc\omega)$ is the normalized strength of the TM wave, $E_0$=the amplitude of the TM wave electric field, $-|e|$=the charge of an electron, m=the mass of an electron, c=the speed of light, and ω=the TM wave angular frequency.

and in Eq. (1) where:

$\lambda_w$=the wiggler period, $a_w=|e|\lambda_w B_w/(2\pi mc^2)$ is the normalized strength of the wiggler 21, and $B_w$=the wiggler magnetic field.

The distance L along the axis of the wiggler 21 at which complete beam conditioning is obtained is an integral number n (=1,2,3, . . . ) of ½-betatron periods from the wiggler entrance, i.e., L=n$\lambda_\beta$/2, where $\lambda_\beta$=(2$\gamma_0$/$a_w$)$\lambda_w$ is the betatron period.

A full scale particle simulation of an electron beam in a wiggler and conditioning field has been carried out. Two examples of beam conditioning operations are illustrated using a 10 MeV injected electron beam and using a 1 MeV injected electron beam. The simulation parameters for conditioning a 10 MeV injected electron beam (Example #1) and for conditioning a 1 MeV injected electron beam (Example 2) are listed in the following TABLE I.

TABLE I

|  | Example #1 | Example #2 |
| --- | --- | --- |
| Electron Beam |  |  |
| Energy, E | 10 MeV | 1 MeV |
| Emittance, $\epsilon_n$ | 3.5 × 10$^{-3}$ cm-rad | 3.5 × 10$^{-3}$ cm-rad |
| RMS Radius, $r_b$ | 0.14 cm | 0.14 cm |
| Initial Axial Energy Spread | 2.3 × 10$^{-4}$ | 2.4 × 10$^{-4}$ |
| Final (Min.) Axial Energy Spread | 5.8 × 10$^{-6}$ | 7.9 × 10$^{-6}$ |
| Wiggler |  |  |
| Strength Parameter, $a_w$ | 0.175 | 0.175 |
| Period, $\lambda_w$ | 3.14 cm | 3.14 cm |
| Betatron Period, $\lambda_\beta$ | 754 cm | 104 cm |
| Conditioning Field |  |  |
| Wavelength, $\lambda$ | 2 cm | 2 cm |
| Strength Parameter, $a_0$ | 0.1 | 2 × 10$^{-3}$ |
| Electric Field, $E_0$ | 160 kV/cm | 3.2 kV/cm |
| Interaction Length, ~$\lambda_\beta$/2 | 375 cm | 53 cm |

For the 10 MeV injected electron beam (Example #1), the axial velocity spread of the beam in the conditioning fields will reach a minimum at 375 cm.

Figure 3:
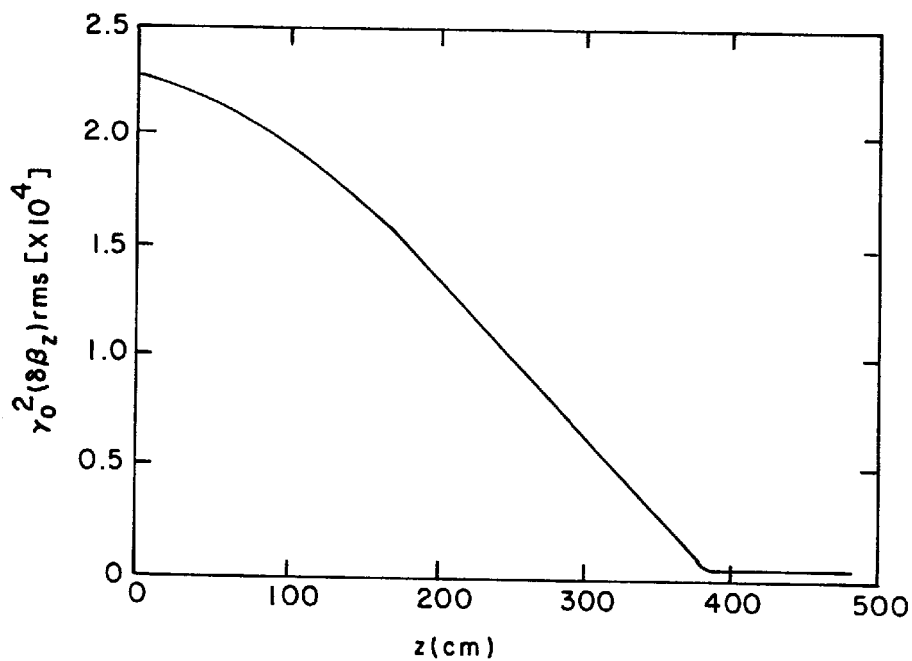
FIG. 3 shows the root mean square (rms) beam axial energy spread, $\gamma_0^2(\delta\beta_z)_{rms}$, as a function of distance.

FIG. 3 shows the root mean square (rms) beam axial energy spread, $\gamma_0(\delta\beta_z)_{rms}$, as a function of distance. In this illustration the axial energy spread is reduced by a factor of approximately 40 over a distance of approximately 400 cm. As shown in TABLE I, Example #1, this reduction in the axial energy spread is from an initial axial energy spread of 2.3×10$^{-4}$ at the output of the accelerator 13 to the final (min.) axial energy spread of 5.8×10$^{-6}$ at the output of the wiggler 21 of conditioner 17. This is a significant decrease in the axial energy spread of the electrons. The required value of the conditioning field, i.e., $a_0$=0.1, is in excellent agreement with the value predicted by Eq. (1).

For the 1 MeV injected electron beam (Example #2), the rms spread in the axial velocity is observed to be reduced by a factor of approximately 30. The required value of the conditioning field is again in excellent agreement with the analytical prediction.

The above-described system for conditioning an electron beam is the only conditioning system known to applicants that has been demonstrated by numerical calculations to reduce the axial velocity spread on an electron beam. Conditioned beams are expected to permit the operation of free-electron lasers at wavelengths that were, up to this time, believed to be unattainable.

By judicious choice of wavelength and mode structure, electromagnetic waves may be used to condition beams for use in many free-electron sources of radiation. These free-electron sources include FELs, traveling wave tubes, gyrotrons and cyclotron autoresonance masers. In an alternative system application of the invention, the energy spread introduced on the beam may be correlated with the electron synchrotron motion, thereby reducing the axial velocity spread.

Therefore, what has been described in a preferred embodiment of the invention is a system for developing a conditioned electron beam of high quality for application to a free-electron source of coherent radiation. The system comprises: a source for producing an electron beam of relatively high energy; a microwave source for generating a microwave field; and a magnetic wiggler for generating transverse to the electron beam a periodic magnetic field which cooperates with the microwave field to interact with the electron beam and develop a conditioned electron beam of high quality.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A system for developing a conditioned electron beam of a final quality for application to a free-electron source of coherent radiation, said system comprising:

means for producing an electron beam having a predetermined energy and initial quality;

means for generating microwaves; and a magnetic wiggler responsive to the electron beam from said producing means and to the microwaves from said generating means for developing the conditioned electron beam of final quality, higher than the initial quality, to enhance the operation of the free-electron source of coherent radiation.

2. The system of claim 1 wherein said producing means includes:

a source for producing an electron beam of initial energy; and an accelerator responsive to the electron beam of initial energy for developing the electron beam of predetermined energy and of initial quality.

3. The system of claim 1 wherein:

said generating means is a microwave source selected from the group consisting of a traveling wave tube and a klystron.

4. A system for developing a conditioned electron beam of a final quality for application to a free-electron source of coherent radiation, said system comprising:

means for producing an electron beam having a predetermined energy and initial quality and wherein electrons in the electron beam have a velocity;

means for generating microwaves; and means responsive to the electron beam and the microwaves for developing the conditioned electron beam of final quality, higher than the initial quality, to enhance the operation of the free-electron source of coherent radiation, said developing means including a magnetic wiggler for producing a magnetic field which operates in combination with the microwaves to improve the initial quality of the electron beam of predetermined energy by selectively adjusting the velocity of electrons in the electron beam of predetermined energy so that all of the electrons in the electron beam of predetermined energy have the same velocity in one common axial direction.

5. The system of claim 4 further including:

a vacuum chamber and;

a waveguide disposed inside said vacuum chamber for receiving the electron beam, said magnetic wiggler being disposed inside said waveguide.

6. The system of claim 5 wherein said producing means includes:

a source for producing an electron beam of initial energy lower than the predetermined energy; and an accelerator responsive to the electron beam of initial energy for developing the electron beam of predetermined energy and of initial quality.

7. The system of claim 6 wherein:

said generating means is a microwave source selected from the group consisting of a traveling wave tube and a klystron.

8. A system for developing a conditioned electron beam of final quality for application to a free-electron source of coherent radiation, said system comprising:

a source for producing an electron beam of initial energy;

an accelerator responsive to the electron beam of initial energy for developing an electron beam of predetermined energy and of initial quality lower than the final quality;

a microwave source for generating microwaves, said microwave source selected from the group consisting of a traveling wave tube and a klystron; and means responsive to the electron beam of predetermined energy and initial quality from said accelerator and to the microwaves from said microwave source for developing a conditioned electron beam of the final quality to enhance the operation of the free-electron source of coherent radiation.

9. A system for developing a conditioned electron beam of final quality for application to a free-electron source of coherent radiation, said system comprising:

a source for producing an electron beam of initial energy and wherein electrons in the electron beam have a velocity;

an accelerator responsive to the electron beam of initial energy for developing an electron beam of predetermined energy and of initial quality lower than the final quality;

a microwave source for generating microwaves, said microwave source selected from the group consisting of a traveling wave tube and a klystron; and means responsive to the electron beam of predetermined energy and initial quality and to the microwaves for developing a conditioned electron beam of the final quality to enhance the operation of the free-electron source of coherent radiation, said developing means including a magnetic wiggler for producing a magnetic field which operates in combination with the microwaves to improve the initial quality of the electron beam of predetermined energy by selectively adjusting the velocity of electrons in the electron beam of predetermined energy so that all of the electrons in the electron beam of predetermined energy have the same velocity in one common axial direction.

10. A system for generating a final quality electron beam, said system comprising:

means for producing an electron beam having an initial quality;

a vacuum chamber traversed by the electron beam;

means for generating and applying a microwave field to said vacuum chamber;

a wiggler disposed in said vacuum chamber for generating transverse to the electron beam in said vacuum chamber a periodic magnetic field which cooperates with the microwave field to interact with the electron beam and develop a conditioned electron beam of the final quality higher than the initial quality.

11. The system of claim 10 further including:

a waveguide disposed inside said vacuum chamber for receiving the electron beam, said wiggler being disposed inside said waveguide.

12. The system of claim 10 wherein said producing means includes:

a source for producing an initial electron beam at an initial energy level; and means for accelerating said initial electron beam to develop the electron beam at a higher energy level than the initial energy level.

13. The system of claim 12 wherein:

said source for producing an initial electron beam is an electron gun; and said accelerating means is an accelerator.

14. The system of claim 13 wherein:

said means for generating and applying a microwave field is a microwave source selected from the group consisting of a traveling wave tube and a klystron.

15. The system of claim 14 further including:

a waveguide disposed inside said vacuum chamber for receiving the electron beam, said wiggler being disposed inside said waveguide.

* * * * *